(12) United States Patent
Arkko et al.

(10) Patent No.: US 7,343,497 B2
(45) Date of Patent: Mar. 11, 2008

(54) SECURITY IN COMMUNICATION NETWORKS

(75) Inventors: Jari Arkko, Kauniainen (FI); David Castellanos-Zamora, Madrid (ES); Krister Boman, Molndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 793 days.

(21) Appl. No.: 10/271,531

(22) Filed: Oct. 17, 2002

(65) Prior Publication Data

US 2003/0074553 A1  Apr. 17, 2003

(30) Foreign Application Priority Data

Oct. 17, 2001  (GB)  .................................. 0124891.3

(51) Int. Cl.
*G06F 11/30* (2006.01)
*H04L 9/00* (2006.01)

(52) U.S. Cl. ..................... 713/201; 713/193; 713/152
(58) Field of Classification Search ........ 713/189–201, 713/152
See application file for complete search history.

(56) References Cited

U.S. PATENT DOCUMENTS

| | | | |
|---|---|---|---|
| 5,499,297 A | | 3/1996 | Boebert |
| 5,727,145 A | * | 3/1998 | Nessett et al. ................. 726/5 |
| 6,088,451 A | * | 7/2000 | He et al. ........................ 726/8 |
| 6,158,011 A | | 12/2000 | Chen et al. |
| 6,304,973 B1 | * | 10/2001 | Williams ...................... 726/3 |
| 6,487,665 B1 | * | 11/2002 | Andrews et al. ............. 726/26 |
| 7,107,464 B2 | * | 9/2006 | Shapira et al. ............... 726/15 |
| 2003/0005331 A1 | * | 1/2003 | Williams ..................... 713/201 |
| 2003/0061480 A1 | * | 3/2003 | Le et al. ..................... 713/153 |

FOREIGN PATENT DOCUMENTS

| | | |
|---|---|---|
| EP | 0 511 497 A2 | 11/1992 |
| WO | 00/77619 A2 | 12/2000 |
| WO | 01/35691 A1 | 5/2001 |

(Continued)

OTHER PUBLICATIONS

Stefan putz, Ronald Schmitz, Tobias Martin: Security Mechanisms in UMTS, 2001.*

(Continued)

*Primary Examiner*—Nasser Moazzami
*Assistant Examiner*—Mohammad Reza
(74) *Attorney, Agent, or Firm*—Nixon & Vanderhye P.C.

(57) ABSTRACT

A method of facilitating the interworking of network elements of one or more communication networks some of which network elements support a given security mechanism and others of which do not. The method comprises, at each network element which does support the security mechanism, maintaining a database listing peer network elements and an indication of whether or not the peer network elements support the security mechanism. Upon initiation of a signalling communication from a peer network element supporting the security mechanism to another peer network element, inspecting the database of the initiating network element to determine whether or not the peer network element supports the security mechanism, and conducting the communication accordingly. The databases 9 stored at network elements are updated dynamically based upon signalling information received from peer network elements. The method ensures that the security mechanism for securing communications between elements is used when the mechanism is available.

14 Claims, 3 Drawing Sheets

FOREIGN PATENT DOCUMENTS

WO      02/07404 A2      1/2002
WO      02/25962 A2      3/2002

OTHER PUBLICATIONS

James Beck, Alain Geffaqut, Nayeem Islam: MOCA: A service framework for mobile computing devices, 1999.*

Stephen Kleier et al: Advanced services excution and services provisioning for future telecommunication networks (UMTS), 1999.*

Bright Kreller, UMTS: A middleware architecture and mobile API approach, 1998.*

Jeffrey W. Humphries et al, Secure mobile agents for network vulnerability scanning, 2000.*

Paulo Jorge Marques et al, security mechanisms for using mobile agents in electronic commerce, 1998.*

Dirk Fox, Der IMSI-Catcher, 2002.*

* cited by examiner

SECURITY IN COMMUNICATION NETWORKS

FIELD OF THE INVENTION

The present invention relates to security in communication networks and in particular, though not necessarily, to a mechanism for ensuring the secure transport of signalling messages between network elements in and between public land mobile networks.

BACKGROUND TO THE INVENTION

The European Telecommunications Standardisation Institute (ETSI) is currently in the process of standardising a new set of protocols for mobile telecommunications systems. The set of protocols is known collectively as Universal Mobile Telecommunications System (UMTS). The architecture of a UMTS network is based upon a UMTS core network and a UMTS Terrestrial Radio Access Network (UTRAN). Within and between core networks, it will be necessary to transfer signalling information between network elements such as Mobile Switching Centres (MSCs) and Home and Visitor Location Registers (HLRs/VLRs). The signalling network itself may be an SS7 network or possibly an IP network. The protocol used for transporting signalling messages is the Mobile Application Part (MAP) protocol which is currently used in the second generation GSM networks. MAP will be enhanced to provide additional features.

The introduction of UMTS will be a gradual process. UMTS networks must therefore interwork with existing networks for the foreseeable future. It is also envisaged that within a given network there may be network elements which implement the enhanced MAP protocol and other network elements which don't. Again, interworking between these different elements must be possible.

One of the enhancements being made to MAP is the introduction of improved security for signalling traffic. A protocol called MAPSEC implements this security and carries MAP messages. MAPSEC utilises some suitable encryption and authentication mechanism. The use of MAPSEC in an internodal communication is specified by a Security Policy Database (SPD) of one or more of the communicating network elements. The SPD specifies that MAPSEC shall be applied to all signalling communications towards a particular network. According to the current proposals, a MAPSEC protected communication commences with the sending of a MAPSEC message (containing a MAP message) from the initiating network element (which is assumed to be MAPSEC capable) to a peer network element. In the event that the peer network element is MAPSEC capable, that network element will return a MAPSEC response message. This is illustrated in FIG. 1. In the event that the peer network element is not MAPSEC capable, the network element will return a message to the initiating network element that it does not support MAPSEC (this may be a MAP message indicating that the received MAPSEC message was not recognised). The initiating network element will then forward an unprotected MAP message to the peer network element which will respond with a MAP response message. This exchange of messages is illustrated in FIG. 2.

The exchange of messages illustrated in FIG. 2 will add two round trip delays to the process. Particularly during the early stages of UMTS introduction, when most network elements will not have MAPSEC capability, this will represent a significant extra load on signalling networks and will delay many network operations (e.g. call set-up). It will be appreciated that this problem is not unique to public land mobile networks (PLMNs) (or to the MAP protocol), and may arise in other types of network where different nodes have different security policies.

SUMMARY OF THE INVENTION

It is an object of the present invention to overcome or at least mitigate the problems noted in the previous paragraph. This and other objects may be achieved by introducing a database identifying the security capabilities of network elements. If a network element having the necessary security capabilities has access to this database, then the problems of delay and additional signalling can be mitigated.

According to a first aspect of the present invention there is provided a method of facilitating the interworking of network elements of one or more communication networks, some of which network elements support a given security mechanism and others of which do not, the method comprising:

at each network element which does support the security mechanism, maintaining a database listing peer network elements and an indication of whether or not the peer network elements support the security mechanism;

upon initiation of a signalling communication from a peer network element supporting the security mechanism to another peer network element, inspecting the database of the initiating network element to determine whether or not the peer network element supports the security mechanism, and conducting the communication accordingly; and dynamically updating the databases stored at network elements based upon signalling information received from peer network elements, whereby use of the security mechanism for securing communications between elements is ensured when the mechanism is available.

Embodiments of the present invention reduce the need for additional signalling transfers in the event that a peer network element does not support the security mechanism. It may only be necessary to incur the additional signalling the first time that two network elements communicate. The database can be updated with the result of the first communication (i.e. to indicate whether or not the peer network element implements the security mechanism).

Embodiments of the present invention make configuration of the peer security mechanism database unnecessary (although this may still be done in some circumstances). Typically the default setting for each peer network element is that it does implement the security mechanism. The database is updated dynamically as communications with peer network elements occur.

The present invention is applicable in particular to public land mobile networks. The networks may comprise both UMTS and GSM networks which are required to interoperate. Preferably, said security mechanism is the MAPSEC protocol for securing the transmission of MAP messages between network elements. Alternatively, the or each communication network may be an IP network and the security mechanism may be IPSec.

Preferably, the step of dynamically updating a database stored at a network element implementing the mechanism comprises entering a new network element into the database following the first communication between the network element and a peer network element, together with said indication of whether or not the peer network element supports the security mechanism.

Preferably, a peer network element may be added to a database immediately prior to the initiation of a communication between the network element holding the database and the peer network element.

Preferably, the step of dynamically updating a database stored at a network element implementing the mechanism comprises removing an entry from the database, where the entry indicates that the peer network element does not support the security mechanism, after some predefined time has elapsed since the network element last communicated with the peer network element corresponding to the entry.

Preferably, the step of dynamically updating a database stored at a network element implementing the mechanism comprises reacting to a message received at an initiating network element implementing the security mechanism, which message indicates that the peer network element has switched from not implementing the security mechanism to implementing it, by updating the entry in the database corresponding to the peer network element to identify the new security mechanism state.

Preferably, the step of dynamically updating a database stored at a network element implementing the mechanism is implemented so that the security applied to communications with a peer network element cannot be automatically downgraded.

The database held by a network element may be initialised or updated using data received at the network element from a server of the network within which the network element is located. The server may exchange network element security mechanism data with peer servers of other networks. This exchange may be carried out as part of a procedure for negotiating security associations (e.g. encryption keys, etc) between servers of different networks, which security associations are subsequently used by peer network elements implementing the security mechanism to secure communications.

According to a second aspect of the present invention there is provided a network element for use in a communication network, the network element supporting a security mechanism and being arranged in use to exchange network signalling information with peer network elements of the same and other networks, the network element comprising:

a memory storing a database listing peer network elements and an indication of whether or not the peer network elements support the security mechanism;

means for inspecting the database, upon initiation of a signalling communication with a peer network element, to determine whether or not the peer network element supports the security mechanism, and for conducting the communication accordingly; and means for dynamically updating the database based upon signalling information received from peer network elements, whereby use of the security mechanism for securing communications between elements is ensured when the mechanism is available.

According to a third aspect of the present invention there is provided a method of facilitating the interworking of network elements of one or more communication networks, some of which network elements support a given security mechanism and others of which do not, the method comprising:

making available to each network element which does support the security mechanism, a database listing peer network elements and an indication of whether or not the peer network elements support the security mechanism;

upon initiation of a signalling communication from a peer network element supporting the security mechanism to another peer network element, inspecting the database available to the initiating network element to determine whether or not the peer network element supports the security mechanism, and conducting the communication accordingly; and updating the databases to take into account changes in the security capabilities of network elements whilst preventing the automatic downgrading of security capabilities recorded for network elements, whereby use of the security mechanism for securing communications between elements is ensured when the mechanism is available.

DETAILED DESCRIPTION OF A PREFERRED EMBODIMENT

Figure 1:
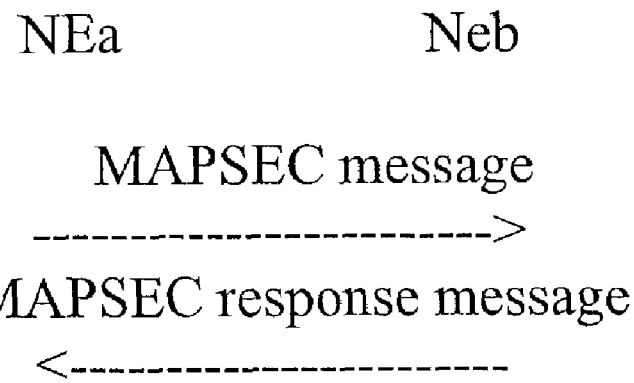
FIG. 1 illustrates signalling exchanged between two signalling network elements of a mobile network, both of which support MAPSEC.
Figure 2:
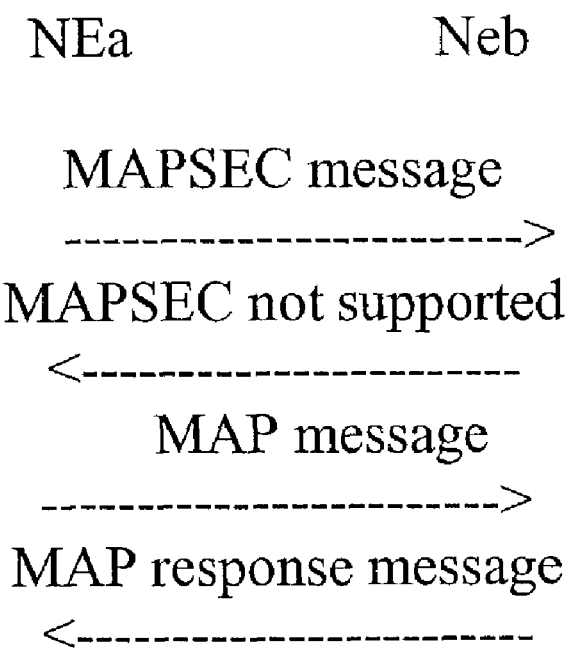
FIG. 2 illustrates signalling exchanged between two signalling network elements of a mobile network, only one of which supports MAPSEC.

The current proposals for handling MAPSEC and the interworking of network elements some of which support MAPSEC and some of which don't have been described above with reference to FIGS. 1 and 2. A new mechanism will now be described with reference to FIG. 3 which illustrates schematically a number of connected public land mobile networks (PLMNs). Of these, two are third generation UMTS (or 3G) networks 1, 2 and one is a second generation GSM network 3. Shown within each of the networks is a Mobile Switching Centre (MSC) 4, 5, 6. Also shown within one of the UMTS networks 1 is a Home Location Register (HLR) 7 and a Visitor Location Register (VLR) 8. The network elements (NEs) communicate with one another over an SS7 signalling network, with each being identified uniquely within the SS7 network by an SS7 point code or global title. The particular functions performed by the NEs will not be described in detail here. Rather, reference should be made to the relevant ETSI standards.

Figure 3:
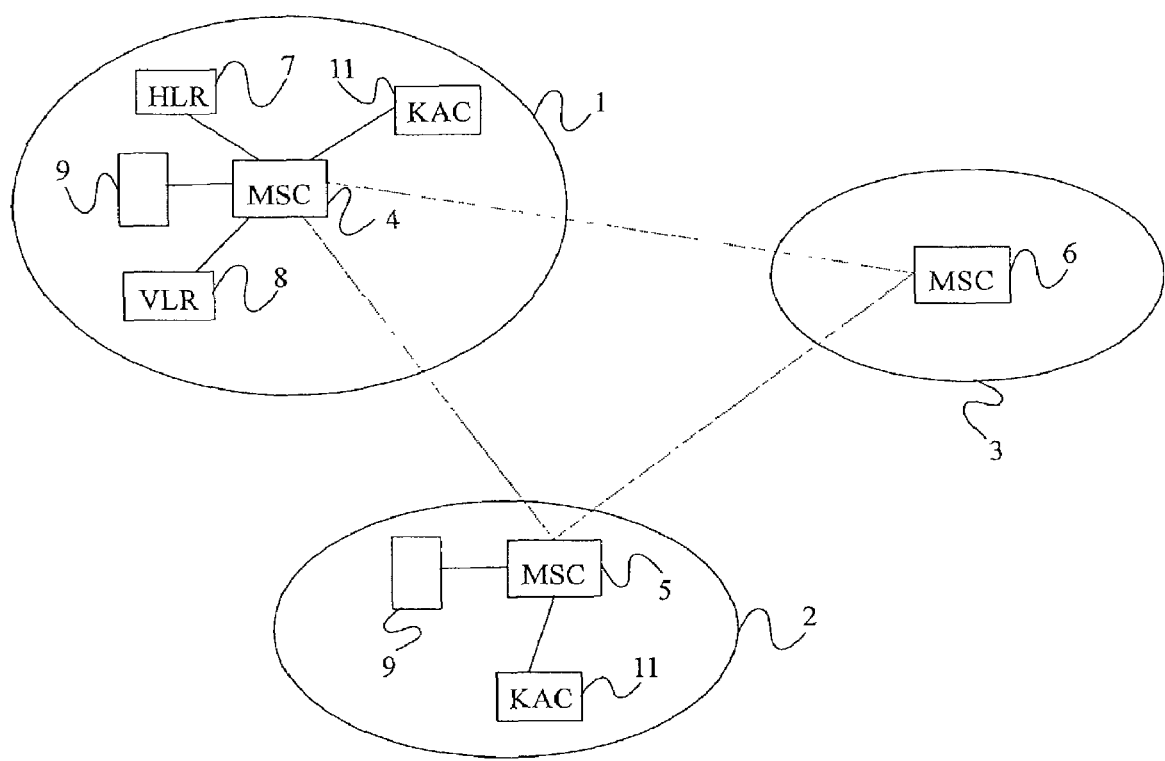
FIG. 3 illustrates schematically a mobile telecommunications network.
Figure 4:
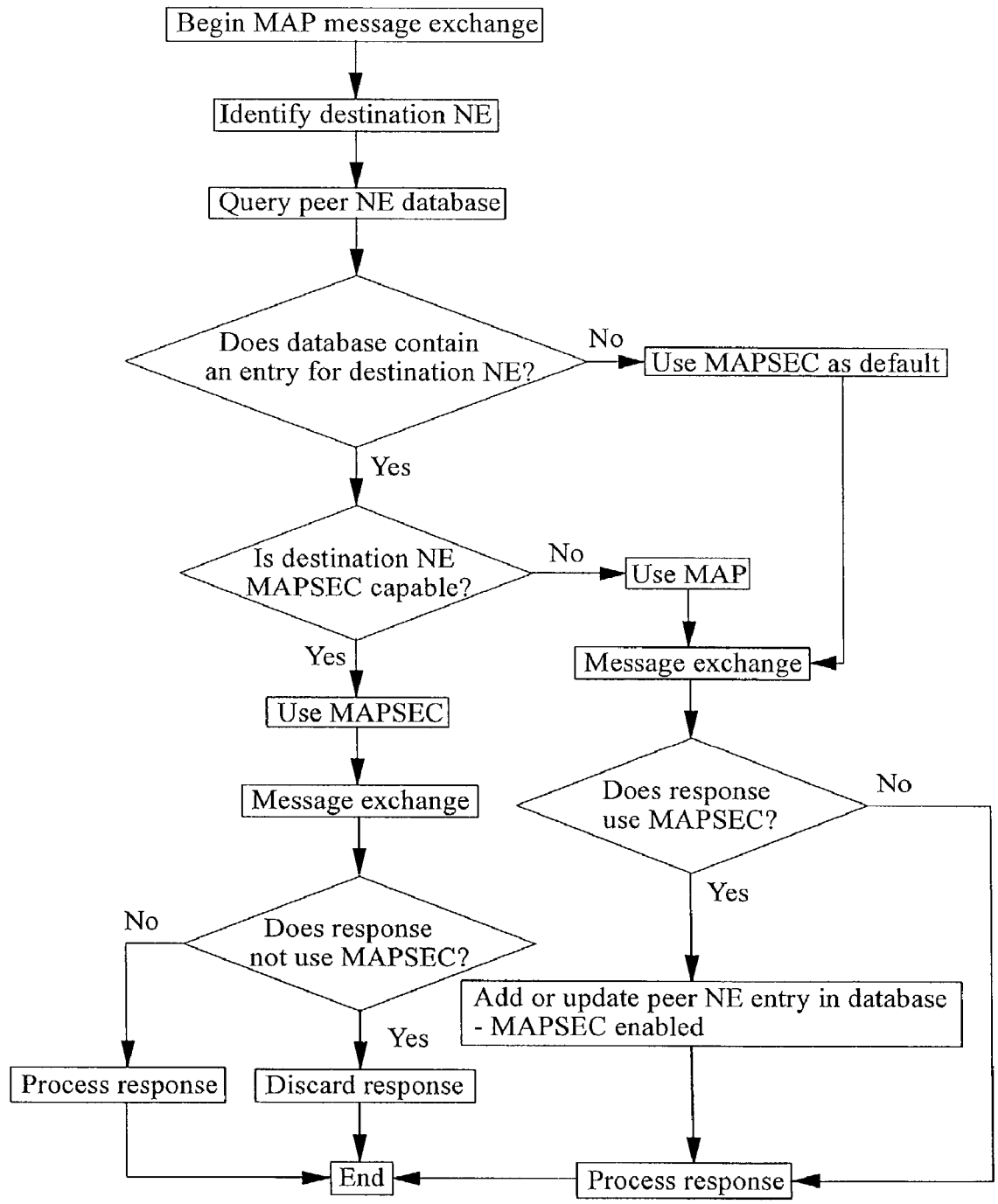
FIG. 4 is a flow diagram illustrating a mechanism for operating a security mechanism in and between mobile networks.

Of relevance here is the need for the various NEs to exchange signalling messages with one another. For this purpose, each of the NEs implements the Mobile Application Part (MAP) protocol. Moreover, the NEs of the UMTS networks 1, 2 additionally implement MAPSEC which is used for securing MAP exchanges between peer NEs. Associated with each MAPSEC capable NE is a database 9 (only one of which is illustrated in FIG. 3). This data base is constructed and maintained as follows.

Each of the UMTS networks comprises a central server 10, 11 referred to here as KAC. The KACs are responsible for negotiating MAPSEC security associations between networks. A security association (or SA) may define for example the encryption keys to be used to encrypt messages sent between networks. The KACs 10, 11 also exchange data identifying which of the NEs for which they are responsible support MAPSEC, and which do not. Each KAC 10, 11 distributes both the SA information and the MAPSEC capability data to each of the NEs of the same network. The SA information is entered into a Security Policy Database (SPD) of the receiving NE. The MAPSEC capability data is entered into the database 9, where peer NEs are identified either by point codes or global titles.

In the event that a NE of the network 1 wishes to exchange MAP messages with a peer NE, the NE is directed by the SPD to examine the relevant entry in the database 9. If the entry for the peer NE indicates that the peer NE has MAPSEC capability (e.g. the NE is a node of the UMTS network 2), MAPSEC messages will be exchanged. On the other hand, if the entry indicates that the peer NE does not have MAPSEC capability (e.g. the peer NE belongs to GSM network 3), MAP messages are exchanged. If there is no entry in the database 9 or there is an entry but the MAPSEC capability is identified as unknown, (indicating that the NEs have not previously communicated and the relevant data was not obtained by the KAC), the SPD indicates that MAPSEC should be used as the default. The signalling illustrated in either FIG. 1 or FIG. 2 will then be exchanged with the peer NE. The database 9 is updated according to the result (the peer NE is either MAPSEC capable or it is not).

An important feature of the security mechanism described here is that it does not allow the security allocated to a peer NE to be downgraded (other than by direct operator intervention). Thus for example if a given MAPSEC capable NE has in its database 9 an entry indicating that a given peer NE is MAPSEC capable, the NE will not change that state in its database if a subsequent communication causes a response to be returned indicating that the peer NE is not MAPSEC capable. This would tend to suggest that an attack on the system is taking place. The initiating NE will under these circumstances ignore and discard the returned message. If this were not done, it would be very easy for an attacker to circumvent the MAPSEC protocol by merely sending a fake response to a MAPSEC request. Another important feature of the mechanism is that it is capable of dealing with changes in the MAPSEC capabilities of NEs, and more particularly anticipates upgrades in the capabilities (from MAPSEC incapable to MAPSEC capable) of NEs whilst at the same time guarding against unexpected downgrades.

In order to maintain security at the maximum level, a MAPSEC capable NE will discard an entry in its database 9 which indicates that a peer NE is not MAPSEC capable, after some predefined time has elapsed since the two NEs communicated. When a communication is subsequently initiated, as the MAPSEC capability of the peer NE is unknown, the SPD of the initiating NE will define that the default mechanism should be used, i.e. MAPSEC. Again, the signalling of either FIG. 1 or 2 will follow.

It will be appreciated by those of skill in the art that various modifications may be made to the above described embodiment without departing from the scope of the present invention. For example, the security maintenance procedure may be applied to NEs of a Virtual Private Network (VPN) using IPSec (and IKE) to secure traffic between two elements. Thus for example the procedure might be implemented so that one node involved in a communication will refuse to downgrade the security of a connection to another node to DES (a specific cipher) from 3DES (a stronger cipher). In another modification, at nodes capable of implementing MAPSEC, information on whether or not MAPSEC has been used for a given communication may be communicated to the application (e.g. MAP) running on top of the security protocol. This might be used to disallow potentially dangerous actions if a satisfactory level of security has not been used.

The invention claimed is:

1. A method of facilitating the interworking of network elements of one or more communication networks, some of which network elements support a given security mechanism and others of which do not, the method comprising:

at each network element which does support the security mechanism, maintaining a database listing peer network elements and an indication of whether or not the peer network elements support the security mechanism;

before or upon initiation of a signalling communication from a peer network element supporting the security mechanism to another peer network element, inspecting the database of the initiating network element to determine whether or not the peer network element supports the security mechanism, and conducting the communication accordingly; and dynamically updating the databases stored at network elements based upon signalling information received from peer network elements, wherein use of the security mechanism for securing communications between elements is ensured when the mechanism is available, wherein each communication network is a public land mobile network, wherein if the peer network element is determined not to support the security mechanism, then the network element supporting the security mechanism does not attempt to negotiate a security association with the peer network element, and wherein the step of dynamically updating a database stored at the network element supporting the security mechanism includes removing an entry from the database, where the entry indicates that the peer network element does not support the security mechanism, after some predefined time has elapsed since the network element last communicated with the peer network element corresponding to the entry.

2. A method according to claim 1, wherein said security mechanism is the MAPSEC protocol for securing the transmission of MAP messages between network elements.

3. A method according to claim 1, wherein each network is an IP network, and the security mechanism is IPSec.

4. A method according to claim 1, wherein the step of dynamically updating a database stored at a network element implementing the mechanism comprises entering a new network element into the database following the first communication between the network element and a peer network element, together with said indication of whether or not the peer network element supports the security mechanism.

5. A method according to claim 1, further comprising adding a peer network element to a database immediately prior to the initiation of a communication between the network element holding the database and the peer network element.

6. A method according to claim 1, wherein the step of dynamically updating a database stored at a network element implementing the mechanism comprises reacting to a message received at an initiating network element implementing the security mechanism, which message indicates that the peer network element has switched from not implementing the security mechanism to implementing it, by updating the entry in the database corresponding to the peer network element to identify the new security mechanism state.

7. A method according to claim 1, wherein the step of dynamically updating a database stored at a network element implementing the mechanism is implemented so that the security applied to communications with a peer network element cannot be automatically downgraded.

8. A method according to claim 1, wherein the database held by a network element is initialized or updated using data received at the network element from a server of the network within which the network element is located, said server exchanging network element security mechanism data with peer servers of other networks.

9. A method according to claim 8, wherein said exchange is carried out as part of a procedure for negotiating security associations between servers of different networks, which security associations are subsequently used by peer network elements implementing the security mechanism to secure communications.

10. A network element for use in a communication network, the network element supporting a security mechanism and being arranged in use to exchange network signalling information with peer network elements of the same and other networks, the network element comprising:
    a memory for storing a database listing peer network elements and an indication of whether or not the peer network elements support the security mechanism;
    a controller for inspecting the database, before or upon initiation of a signalling communication with a peer network element, to determine whether or not the peer network element supports the security mechanism, for conducting the communication accordingly, and for dynamically updating the database based upon signalling information received from peer network elements,
    wherein use of the security mechanism for securing communications between peer network elements is ensured when the mechanism is available,
    wherein if the peer network element is determined not to support the security mechanism, then the controller is configured to not attempt to negotiate a security association with the peer network element, and
    wherein the controller is further configured to dynamically update the database by removing an entry from the database, where the entry indicates that the peer network element does not support the security mechanism, after some predefined time has elapsed since the network element last communicated with the peer network element corresponding to the entry.

11. A method of facilitating the interworking of network elements of one or more communication networks, some of which network elements support a given security mechanism and others of which do not, the method comprising:
    making available to each network element which does support the security mechanism, a database listing peer network elements and an indication of whether or not the peer network elements support the security mechanism;
    before or upon initiation of a signalling communication from one peer network element supporting the security mechanism to another peer network element, inspecting the database available to the initiating network element to determine whether or not the peer network element supports the security mechanism, and conducting the communication accordingly; and
    updating the databases to take into account changes in the security capabilities of network elements while preventing the automatic downgrading of security capabilities recorded for network elements, the updating including removing an entry from the databases, where the entry indicates that the another peer network element does not support the security mechanism, after some predefined time has elapsed since the another peer network element last communicated with the one peer network element supporting the security mechanism,
    wherein use of the security mechanism for securing communications between peer network elements is ensured when the mechanism is available, and
    wherein if the another peer network element is determined not to support the security mechanism, then the one network element supporting the security mechanism does not attempt to negotiate a security association with the another peer network element.

12. A method according to claim 11, wherein the databases are stored and updated at respective network elements, the databases being dynamically updated based upon signalling information received from peer network elements.

13. A method according to claim 11, wherein the databases are stored at centralized server nodes of respective communication networks and are updated based upon data exchanged between server nodes.

14. A method according to claim 13, wherein updated databases are distributed by server nodes to network elements of the same communication networks.

* * * * *